United States Patent [19]

Ellerbrock

[11] Patent Number: 5,511,912
[45] Date of Patent: Apr. 30, 1996

[54] HAND TOOL ATTACHMENT

[76] Inventor: Brian E. Ellerbrock, 13134 State Rte. 15, Ottawa, Ohio 45875

[21] Appl. No.: 308,158

[22] Filed: Sep. 19, 1994

[51] Int. Cl.⁶ .................................................. B23B 45/00
[52] U.S. Cl. ........................... 408/20; 30/123.3; 30/392; 30/500; 74/56; 83/169; 144/35 A; 279/144; 408/56; 408/239 A
[58] Field of Search .................................. 408/20, 21, 56, 408/61, 239 A; 30/122, 392, 500, 123.3, 393, 394, 277; 144/35 A; 74/56; 83/98, 169; 173/48, 205; 279/143, 144

[56] References Cited

U.S. PATENT DOCUMENTS

| 1,040,424 | 10/1912 | Salt | 173/205 |
|---|---|---|---|
| 1,588,832 | 6/1926 | Young | 74/56 |
| 2,211,741 | 8/1940 | Elwell | 74/56 |
| 2,746,493 | 5/1956 | Babcock | 144/35 A |
| 3,286,776 | 11/1966 | Richison et al. | 173/48 |
| 3,449,967 | 6/1969 | Dancsik | 74/56 |

*Primary Examiner*—Steven C. Bishop
*Attorney, Agent, or Firm*—Donald R. Fraser

[57] ABSTRACT

An attachment for a hand tool for converting rotary motion to reciprocating motion to an air bathed tool holding chuck.

8 Claims, 2 Drawing Sheets

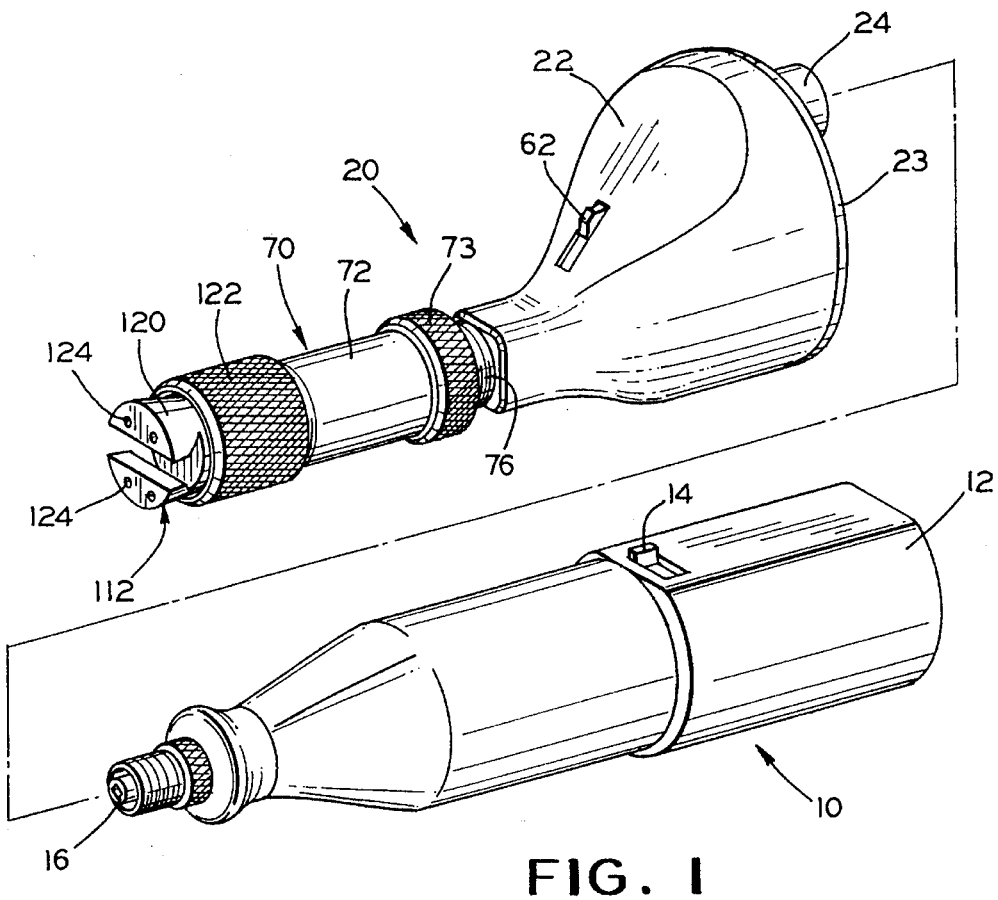
FIG. 1
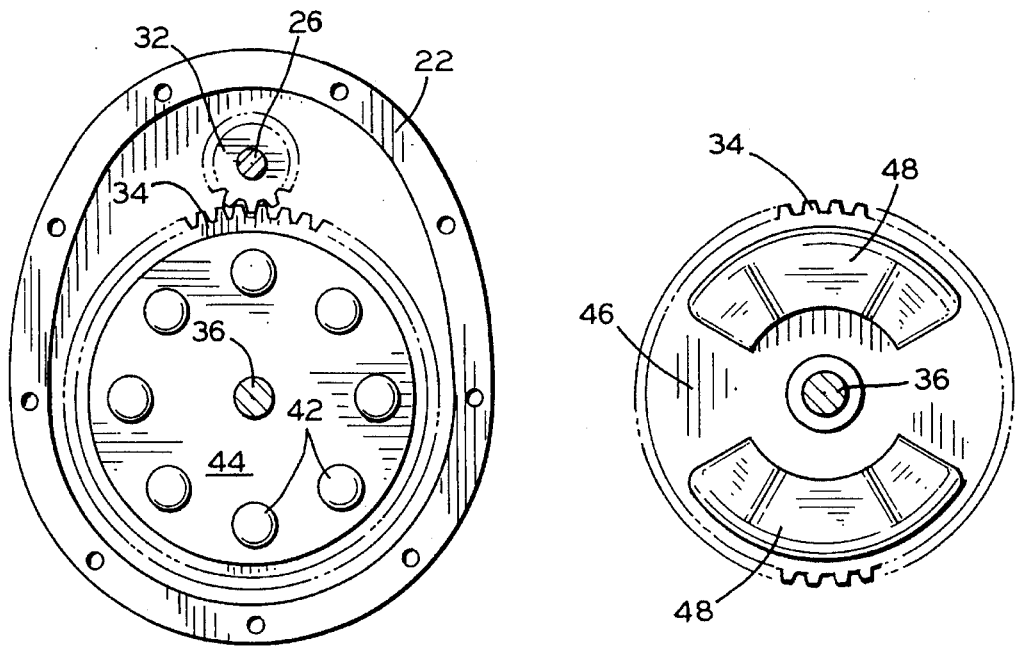
FIG. 3
FIG. 4

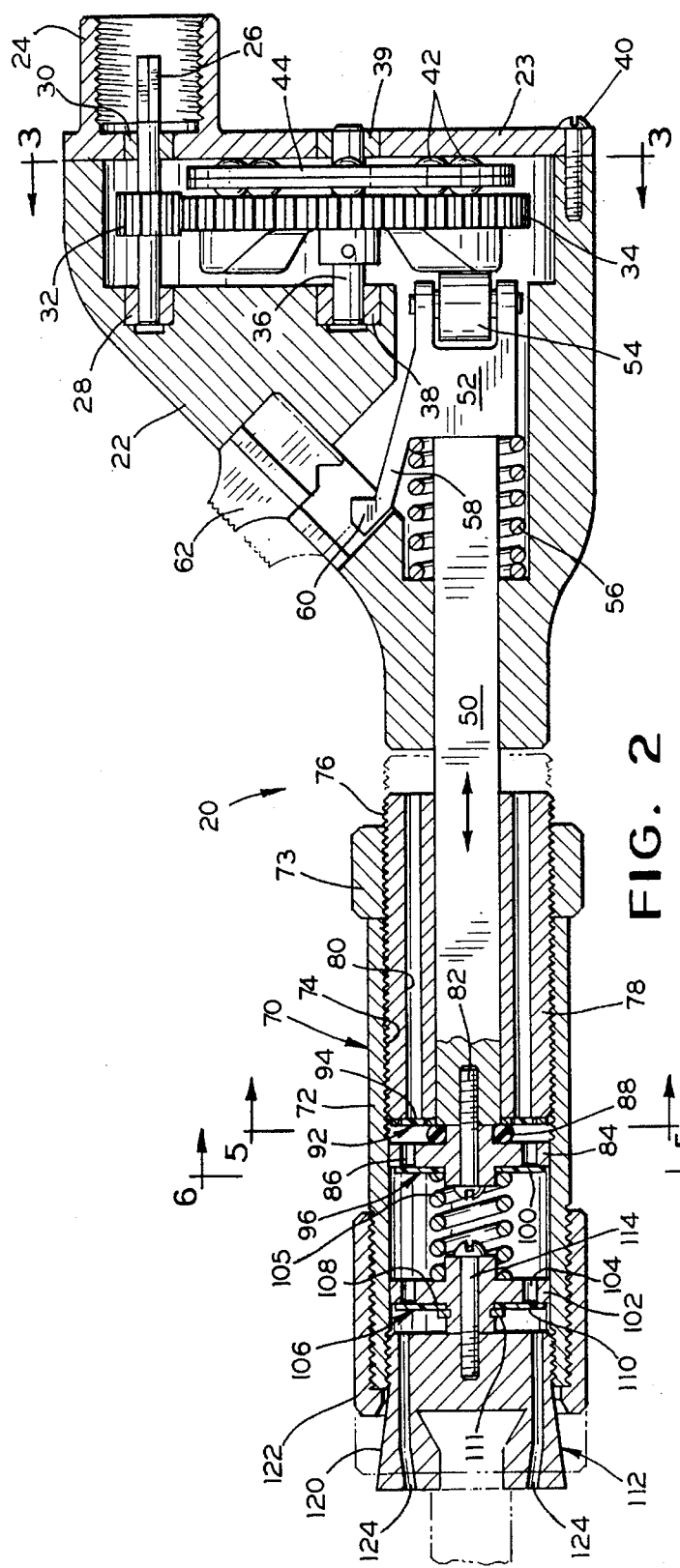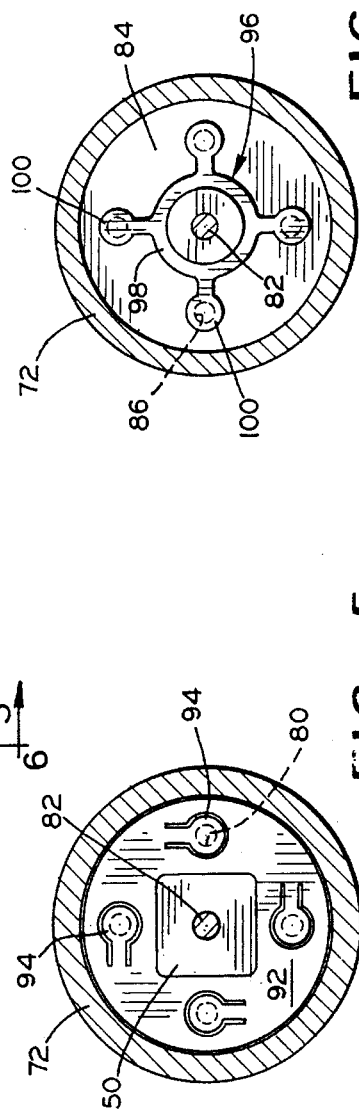
FIG. 2
FIG. 5
FIG. 6

5,511,912

HAND TOOL ATTACHMENT

BACKGROUND OF THE INVENTION

With the advent of higher torque, high speed fractional horse power electric motors brought about considerably increased use of hand-held power tools for both the professional and the craftsman. Speed control further enhanced the use of hand-held power tools to enable the tool to be driven at the correct or preferable speed for each assignment. Variable speed tools providing speeds of from 0–20,000 rpm are commercially available. Such control enables a single tool with the proper attachments to grind, polish, cut, carve, sand, sharpen, deburr wood, metal, ceramics and other materials. Also, such tools enable a user to engrave, polish, cut, grind, rout, and polish extremely small articles.

SUMMARY OF THE INVENTION

It is an object of the invention to produce an attachment for existing power tools which can readily convert the rotary motion of a power tool output to a reciprocating motion output.

Another object of the invention is to produce an attachment for conventional power tools enabling rotary motion to be converted to reciprocating motion to drive reciprocating attachments including files, brushes, scrapers, knives, rasps, hammers, chisels, sanders, carvers and saws.

Another object of the invention is to produce an attachment for the rotating output of a conventional power driven hand tool to provide a source of compressed air.

Still another object of the invention is to produce an attachment for the rotating output of a conventional hand tool which provides a flow of high pressure air around an attached tool to maintain the working area free from debris.

The above as well as other objects of the invention may be readily achieved by an attachment for the conventional rotary output of a hand tool including a housing, a tool holder mounted for reciprocating movement with respect to the housing, spring means biasing the tool holder in a first direction, a crown cam mounted in the housing for rotary movement to intermittently urge the tool holder in a second direction against the bias of the spring means and rotary power input for rotating the crown cam to impart reciprocating movement to the tool holder.

Other objects and advantages of the invention will become readily apparent to those skilled in the art by reading the following detailed description of an embodiment of the invention when considered in the light of the accompanying drawings, in which FIG. 1 is an exploded perspective view of the hand tool attachment embodying the features of the present invention and an associated hand tool;

FIG. 2 is a sectional view of the hand tool attachment illustrated in FIG. 1;

FIG. 3 is a sectional view taken along line 3—3 of FIG. 2;

FIG. 4 is a plain view of the crown cam;

FIG. 5 is a sectional view taken along line 5—5 of FIG. 2; and

FIG. 6 is a sectional view taken along line 6—6 of FIG. 2.

DESCRIPTION OF THE PREFERRED EMBODIMENTS

Referring to the drawings, there is illustrated a hand tool 10 and an associated attachment 20 incorporating the feature of the present invention. The hand tool 10 is a commercially available rotary tool of the type sold by Dremel of Racine, Wis. and identified as Model 750. The hand tool 10 is employed to provide the power to drive the attachment 20. As alluded to earlier in the description, the attachment 20 of the invention is employed to convert the rotating output torque of the hand tool 10 to a reciprocating motion to operate reciprocating tools such as for example, files, brushes, scrapers, knives, rasps, hammers, picks, chisels, sanding devices, carving devices, and saw blades.

The illustrated hand tool 10 is of the cordless type containing a removable, rechargeable battery pack, not shown, and contained within a housing 12. The internally situated electrical motor, not shown, is actuated by an on-off switch 14. The electrical motor drives an output shaft 16 which normally would receive a chuck, for example, to hold rotatably operated tools such as, for example, drills, cutters, abrasive wheels, grinding points, sanding accessories, polishing wheels and the like.

The attachment 20 containing the present inventive concepts is employed to convert the rotary torque output of the hand tool 10 to a reciprocating motion. More particularly, the attachment 20 includes a housing 22 and a tool holder 70.

The housing 22 has cover plate 23 with an internally threaded input 24 and an input shaft 26 which is adapted to be attached to the output shaft 16 of the hand tool 10. The shaft 26 is suitably mounted to rotate in spaced apart bushings 25, 30. The input shaft 26 carries a gear 32 adapted to drive a gear 34 mounted on shaft 36. The shaft 36 is rotably mounted in spaced apart bushings 38 and 39. The bushings in 28 and 38 are mounted in the housing 22 while the bushings 30 and 39 are mounted in the cover plate 23. The cover plate 23 is secured to the housing 22 by a series of annularly disposed threaded bolts 40.

A plurality of ball bearings 42 mounted in a bearing cage 41 is mounted on the shaft 36 to provide for thrust between one surface of the gear 34 and the facing inner surface of the cover plate 23.

The opposite or innermost surface of the gear 34 is provided with a crown cam 46 having spaced apart ramp and cam surfaces 48 as illustrated in FIG. 4.

One end portion of a shaft 50 which is typically square in cross section, is mounted for reciprocating movement in a suitably shaped bore formed in the housing 22. The innermost end of the shaft 50 is provided with a cam follower 52 which includes a roller 54. The drive shaft 50 and the associated cam follower 52 are biased inwardly by helical spring 56 which effectively maintains contact between the roller 54 of the cam follower 52 and the crown cam 46.

The cam follower 52 is provided with a generally outwardly extending arm 58 terminating in a wedge shaped terminus 60. The wedge-shaped terminus 60 is adapted to engage a suitably recessed portion of a finger actuated switch 62 mounted for movement in a recess formed in the housing 22.

The opposite end of the drive shaft 50 is secured coaxially with the interior of the tool holder 70. More particularly, the tool holder 70 includes an outer sleeve 72 having an internally threaded portion 74 for threadably receiving the external threads of an externally threaded portion 76 of an internal cylindrical member 78 having a series of quadrantly spaced air passages 80 and a cylindrical central covering of a rectangular cross-section for receiving the other end of the drive shaft 50 which is likewise of rectangular cross-section. The relative position of the outer sleeve 72 and the inner sleeve 78 is maintained by a lock nut 73.

The innermost end of the shaft 50 is maintained within the tool holder 70 by a threaded fastener 82 which secures a disc-shaped piston 84 typically containing quadrantly spaced passageways 86. An O-ring 88 is disposed between the innermost end of the shaft 50, the facing surfaces of the piston 84, and a valve member 92 having flap valve covers 94 suitably positioned to seat over the passages 80 of the cylindrical member 78. The valve member 92 may be formed of a number of different sheet materials of available elastomeric materials such as rubber, for example.

A valve member 96 is disposed adjacent to opposite surface of the piston 84. The valve member 96 is provided with an annular center 98 having quadrantly arranged radially extending flap valves 100.

Another disc-shaped piston 102, similar to the piston 84, containing quadrantly spaced passages 104 is disposed within one interior of the outer cylinder 72 and is spaced from the piston 84. The spacing between the pistons 84 and 102 is maintained by a helical springs spacing 105. The relative position of the spring 105 and the associated pistons by fitting the ends of the spring 105 over suitably dimensional busses found on the facing surfaces of the respective pistons 84 and 102. It will be appreciated that the spring 105, along with the shape of the shaft 50, function to properly maintain the valve member 96 in the desired orientation in respect of the relationship of the valve covers 94 and the respective passages 80.

A valve member 106, similar to the valve member 96, is disposed adjacent the opposite surface of the piston 102. The valve member 106 is provided with an annular center 108 and has quadrantly arranged radially extending flap valves 110. The valve member 106 may be secured to the piston 102 by a circle clip 111, for example.

The piston 102 is connected to a tool holding chuck 112 by a threaded fastener 114. The innermost end of the chuck 112 is provided with an externally threaded portion 116 adapted to threadably engage with an internally threaded portion 118 of the sleeve 72. The chuck 112 has outwardly tapered outer wall portion 120 which cooperates with the end portion of a threaded collar 122. By causing the collar 122 to be moved outwardly of the sleeve 72, the inwardly tapered end urges the jaws of the chuck 112 to close and securely hold the selected tool being used. The jaws of the chuck 112 are provided with air passages 124 adapted to introduce pressurized air to the work area of the tool being carried by the chuck 112 to adequately remove any debris caused by the working of the tool.

In operation, it will be appreciated that initially the hand tool 10 and the tool holding attachment 20 are coupled together by threadably securing the output shaft 16 of the hand tool 10 to the input shaft 26 of the tool holding attachment 20. The tool selection is made now or previously such that the desired tool is suitably secured with the jaws of the chuck 112. The switch 14 is moved to actuate the hand tool 10 causing the output shaft 16 and the associated input shaft 26 and the attachment to rotate.

Rotation of the input shaft 26 causes the gears 32 and 34 to rotate and thus imparts rotating movement of the crown cam 46. The switch 62 is in the full line position illustrated in FIG. 2 allowing the cam follower 52 to be urged by the spring 56 against the crown cam 46. The roller 54 of the cam follower 52 converts the rotation movement of the cam 46 into reciprocating movement of the shaft 50. The reciprocating movement of the shaft 50 likewise causes reciprocation of the tool holding chuck 112 and the associated tool.

Simultaneously, as the shaft 50 is moved toward the left, as in FIG. 2, air in the chamber to the left of the piston 102 is forced through the passages 124 to bathe the zone of the tool with a rather high velocity flow of air to maintain the work area free of debris. On the return stroke of the shaft 50 the series of valve members 100 and 94 are opened thereby militating any reverse flow of air from work area through the passage 124. The function continues at the frequency of the driving hand tool.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A hand tool attachment comprising a housing;

a tool holder mounted for reciprocating movement with respect to said housing;

spring means biasing said tool holder in a first direction;

a crown cam mounted in said housing for rotary movement to intermittently urge said tool holder in a second direction against the bias of said spring means;

rotary power input for rotating said crown cam to impart reciprocating movement to said tool holder; and a cylinder associated with said tool holder and provided with an inlet and an outlet, a piston mounted to reciprocate with said cylinder by said cam to cause an air flow from the outlet.

2. The attachment defined in claim 1 including a switch mounted in said housing for manually urging said tool holder in the second direction out of contact with said crown cam.

3. The attachment as defined in claim 1 wherein said crown cam is provided with one face having a plurality of spaced apart cam surfaces.

4. The attachment defined in claim 1 wherein said tool holder is provided with a cam follower to cooperate with said crown cam, 5. The attachment defined in claim 4 wherein said cam follower includes a roller adapted to contact said crown cam, 6. The attachment defined in claim 1 wherein said tool holder includes at least a pair of relatively moveable tool grasping jaw members.

7. The attachment defined in claim 6 wherein the outlet of said cylinder directs air flow adjacent said jaw members.

8. The attachment defined in claim 7 including a collar threadably secured to said cylinder for securing said jaw members.

* * * * *